United States Patent [19]
Vallieri et al.

[11] Patent Number: 5,948,869
[45] Date of Patent: Sep. 7, 1999

[54] PROCESS FOR THE PREPARATION OF A CATALYST USEFUL FOR THE HYDROGENATION OF STYRENE-BUTADIENE COPOLYMERS

[75] Inventors: Andrea Vallieri, Comacchio; Claudio Cavallo, Forlì; Gian Tommaso Viola, Cervia-Ravenna, all of Italy

[73] Assignee: Enichem S.p.A., Milan, Italy

[21] Appl. No.: 08/882,748

[22] Filed: Jun. 26, 1997

[30] Foreign Application Priority Data

Jul. 4, 1996 [IT] Italy .................................. MI96A1368

[51] Int. Cl.$^6$ .............................. C08F 8/04; C07C 19/02; B01J 31/12
[52] U.S. Cl. ........................ 525/940; 525/338; 525/339; 585/259; 585/261; 502/115; 502/126; 502/129; 502/133; 502/134
[58] Field of Search ..................................... 502/103, 115, 502/126, 129, 133, 134; 525/940, 338, 339; 585/259, 261

[56] References Cited

U.S. PATENT DOCUMENTS 4,980,421 12/1990 Teramoto et al. ....................... 525/338
5,270,274 12/1993 Hashiguchi et al. .................... 502/115

OTHER PUBLICATIONS

Derwent Abstracts, AN 96–136355, JP 08 027 216, Jan. 30, 1996.
Derwent Abstracts, AN 96–146206, JP 08 033 846, Feb. 6, 1996.
Derwent Abstracts, AN 94–290926, JP 06 220 122, Aug. 9, 1994.

*Primary Examiner*—Bekir L. Yildirim
*Attorney, Agent, or Firm*—Oblon, Spivak, McClelland, Maier & Neustadt, P.C.

[57] ABSTRACT

Catalytic composition effective in the selective hydrogenation of olefinic double bonds prepared by the reaction between:

(A) at least one bis(cyclopentadienyl)Titanium derivative having the general formula (I) $(C_5H_5)_2Ti(R)(R_1)$ wherein R and $R_1$, the same or different, are halogens; the above compound (I) being solid or dispersed in one or more non-solvent diluents;

(B) at least one organo derivative having general formula (II) $M(R_2)(R_3)$ wherein M is selected from Zinc and Magnesium, and $R_2$ and $R_3$, the same or different, are selected from $C_1$–$C_{16}$ alkyls;

(C) at least one modifier.

20 Claims, No Drawings

PROCESS FOR THE PREPARATION OF A CATALYST USEFUL FOR THE HYDROGENATION OF STYRENE-BUTADIENE COPOLYMERS

The present invention relates to a process for the preparation of a catalyst useful for the selective hydrogenation of polymers and copolymers of conjugated dienes.

Polymers obtained by the polymerization or copolymerization of conjugated dienes are widely used on a commercial scale.

In the polymeric chain these polymers have olefinic double bonds which, useful in the case of vulcanization, are responsible for a poor resistance to stability, particulary oxidation.

In particular the block copolymers obtained starting from conjugated dienes and substituted vinyl aromatic hydrocarbons are used non-vulcanized as thermoplastic elastomers or as impact-resistant transparent resins or as modifiers of styrene resins and olefinic resins. Owing to the presence of unsaturated double bonds in the polymeric chain, the above block copolymers have a poor resistance to oxidation, to ozone and atmospheric aging. This represents a serious drawback for their application.

This lack of stability can be considerably reduced by selectively hydrogenating the olefinic double bonds of the above copolymers.

The known methods for hydrogenating polymers having olefinic double bonds are based on (1) supported heterogeneous catalysts consisting of inert carriers (for example silica, alumina, carbon) on which a metal such as nickel, platinum, palladium or the like, are deposited and (2) non-supported homogeneous catalysts obtained by reacting an organometallic compound of nickel, cobalt, titanium, or the like, with a reducing compound such as an organoaluminum, an organomagnesium or an organolithium.

With respect to supported heterogeneous catalysts (1), non-supported catalysts (2) have the benefit of a greater activity. This is a considerable advantage as it allows blander hydrogenation conditions to be adopted with smaller quantities of catalyst.

U.S. Pat. No. 4,501,857 describes a hydrogenation process of non-living polymers carried out in the presence of (A) a bis-(cyclopentadienyl) titanium derivative and (B) at least one organolithium derivative, the molar ratio between lithium atoms and titanium atoms being from 0.1 to 100.

EP-A-434.469 describes a catalytic composition which comprises (a) at least one titanium bis-cyclopentadienyl derivative and (b) at least one compound selected from those having general formula (i) $M^2(AlR^3R^4R^5R^6)$ and (ii) $M^2(MgR^3R^4R^6)$, wherein $M^2$ is selected from lithium, sodium and potassium. Compound (i) can be obtained by the reaction of an organo-alkaline compound with an organo-aluminum compound, whereas compound (ii) can be obtained by the reaction of an organo-alkaline compound with an organo-magnesium derivative.

EP-A-601.953 describes a hydrogenation process carried out in the presence of a catalyst having the general formula $Cp_2Ti(PhOR)_2$ or $Cp_2Ti(CH_2PPh_2)_2$.

All the processes cited above in reality differ not so much in the hydrogenation reaction as in the preparation process of the catalytic species.

The process described in U.S. Pat. No. 501,857 is the simplest of those mentioned as it starts from a compound which is easily available on the market (titaniumdicyclopentadienylchloride) and comprises only the addition of an organic lithium derivative. Unfortunately the data provided in this patent show that the process, which is very efficient when applied to living polymers, gives a poor hydrogenation yield when applied to non-living polymers (see Table III as compared to Table II).

On the other hand EP-A-434.469 involves the presence of compounds (i) or (ii), which require the reaction, not included in U.S. Pat. No. 4,501,857, between an organo-alkaline derivative (normally an organolithium derivative) and an organo-aluminum or organo-magnesium derivative, with the Titanium compound.

Similarly the process of EP-A-601.953 is difficult as it involves the preparation and isolation of particular titanium dicyclopentadienyl derivatives obtained starting from $Cp_2TiCl_2$.

In any case all the catalysts of the prior art have the disadvantage of requiring high quantities of Titanium; in addition the hydrogenation rates are not satisfactory.

A catalytic composition has now been found which is useful in the selective hydrogenation of olefinic double bonds which overcomes the drawbacks described above as it is simple to prepare and is much more active than the catalysts mentioned in the above patents.

In accordance with this, the present invention relates to a catalytic composition effective in the selective hydrogenation of olefinic double bonds, particularly olefinic double bonds present in copolymers between dienes and vinylbenzenes, even more particularly copolymers containing styrene-butadiene and styrene-isoprene blocks, prepared by the reaction between:

(A) at least one bis(cyclopentadienyl)Titanium derivative having the general formula (I) $(C_5H_5)_2Ti(R)(R_1)$ wherein R and $R_1$, the same or different, are halogens, preferably $R=R_1=Cl$; the above compound (I) being solid or dispersed in one or more non-solvent diluents;

(B) at least one organo derivative having general formula (II) $M(R_2)(R_3)$, wherein M is selected from Zinc and Magnesium, preferably Magnesium, and $R_2$ and $R_3$, the same or different, are selected from $C_1$–$C_{16}$, preferably $C_1$–$C_8$ alkyls;

(C) at least one modifier.

As described above, it is fundamental for compound (I) to be in solid form or dispersed in a non-solvent diluent medium, preferably dispersed in one or more non-solvent diluents. The term dispersion refers to a multiphase system, in particular biphasic, in which one phase is continuous and the other finely dispersed.

The non-solvent diluent can be introduced as diluent of (I) and/or (II), preferably of the Titanium compound (I) and of the derivative (II), even more preferably essentially of (I).

The non-solvent diluent can also be introduced into the reaction container before the reagents.

Similarly the modifier (C) can be introduced into the reaction environment alone or together with one of the reagents (I) and (II). In the preferred embodiment the modifier is added together with the Titanium compound (I).

Under the above conditions, at the end of the contact with the reagents a finely subdivided brownish-purple suspension is normally formed.

The modifier (C) is selected from (C1) organic compounds containing at least one heteroatom, preferably nitrogenated and oxygenated, and (C2) aromatic compounds.

Typical groups of compounds containing a heteroatom are ethers, for example dimethyl ether, diethylether, di-n-propyl ether, diisopropyl ether, di-n-butyl ether, di-sec-butyl ether, di-t-butyl ether, diphenyl ether, methyl ethyl ether, ethyl butyl ether, butyl vinyl ether, anisol, ethyl phenyl ether, ethylene glycol dimethyl ether, ethylene glycol diethyl ether, ethyleneglycol dibutyl ether, diethyleneglycol dimethyl ether, diethyleneglycol diethyl ether, diethyleneglycol dibutyl ether, polyethyleneglycol dimethyl ethers, polyethyleneglycol diethyl ether, polyethyleneglycol dibutyl ether, tetrahydrofuran, alpha-methoxy-tetrahydrofuran, ethers of 2-hydroxymethyl tetrahydrofuran, pyrane, dioxane, ditetrahydrofuranpropane. In the list of ethers cited above, the term "butyl" refers to all possible isomers, i.e. n-butyl, iso-butyl and terbutyl.

In the preferred embodiment, the compound (C1) is selected from $C_1$–$C_{20}$ ethers of ethylene glycol and diethyleneglycol, even more preferably it is selected from $C_4$–$C_8$ ethers of ethylene glycol.

As mentioned above, the modifier (C) can also be selected from aromatic compounds (C2), for example toluene, benzene, xylenes, alkylbenzenes, alkyltoluenes, alkylxylenes. When the modifier (C) is selected from aromatic compounds (C2), toluene is preferred.

In the preferred embodiment the molar ratio between Magnesium and/or Zinc dialkyl (II) and Titanium dicyclopentadienyl derivative (I) is from 1:1 to 10:1, preferably from 3:1 to 7:1.

The molar ratio between modifier (C) and Ti is from 0.01:1 to 200:1. More specifically, when the compound (C) is selected from ethers, the molar ratio between ether and Ti is from 0.01:1 to 100:1, whereas when the compound (C) is selected from aromatics, the above ratio is from 1:1 to 100:1. The weight percentage of modifier (C) with respect to the diluent, when compound (C) is selected from the group of ethers, is preferably between 0.01% to 6%, even more preferably between 0.05% and 0.5%; when compound (C) is selected from aromatics, the concentration is preferably from 0.1% to 10% by weight, even more preferably between 0.5 and 3% by weight.

Among the organo-Magnesium derivatives, those having general formula (II) $Mg(R_2)(R_3)$ are preferred, wherein $R_2$ and $R_3$, the same or different, are selected from $C_1$–$C_{16}$, preferably $C_1$–$C_8$, alkyls. Typical examples of Magnesium dialkyls are Magnesium di-n-butyl, Magnesium di-isobutyl, Magnesium di-isopropyl, Magnesium butyl-isobutyl, Magnesium di-cyclohexyl, Magnesium butyl-octyl and the relative mixtures.

As far as the non-solvent diluent is concerned, this must be such as not to dissolve compound (I) and must also be inert towards compounds (I) and (II).

More specifically, the non-solvent diluent is selected from aliphatic or cycloaliphatic saturated hydrocarbons and relative mixtures. Typical examples of these non-solvent diluents are propane, butane, n-hexane, n-pentane, iso-pentane, n-heptane, octanes, decanes, cyclopentane, cyclopentanes diversely alkylated, cyclohexane, cyclohexanes diversely alkylated. The preferred non-solvent diluent is cyclohexane.

With respect to the Magnesium compound (II), this is added to the reaction environment preferably in the form of a solution in aliphatic or cycloaliphatic hydrocarbon solvent.

The modifier (C) can be added as such or preferably in a solution of aliphatic or cycloaliphatic hydrocarbon, preferably together with the dispersion of (I).

As far as the temperature and reaction times between (A), (B) and (C) are concerned, these are not determinant for obtaining the catalyst of the present invention. It is preferable however for the temperature to be between 5° C. and 80° C., preferably between 20° C. and 70° C. The contact time between the reagents varies from a few minutes to several hours, usually more than 3 minutes, even more preferably up to 70 minutes.

The preparation of the catalyst must be carried out in an inert atmosphere. The term "inert atmosphere" means an atmosphere of gases which do not react with any of the species present in the reaction environment. Typical examples of these gases are helium, neon, argon, and relative mixtures. Alternatively hydrogen can also be used. Air and oxygen are not suitable as they oxidate or decompose the hydrogenation catalyst making it inactive. Nitrogen is also unsuitable as it reacts with the Titanium compound in its active form.

The present invention also relates to a process for the hydrogenation of olefinic double bonds present in polymers and copolymers of conjugated dienes, which comprises putting the polymer or copolymer of conjugated dienes in contact with hydrogen in an inert solvent in the presence of the catalytic composition according to claim 1, up to a selective hydrogenation of at least 50%, preferably at least 90%, of the olefinic double bonds.

With respect to the hydrogenation reaction of the (co) polymers described above, this is carried out under the usual conditions (temperature, hydrogen pressure, solvent) which are well-known in the prior art. Temperatures of between 20 and 110° C. and pressures of between 1 and 50 bars can be used, the solvents of the (co)polymers essentially consisting of aliphatic or cycloaliphatic, saturated hydrocarbons, and relative mixtures. It is evident that higher temperatures and pressures accelerate the hydrogenation rate.

According to one embodiment, the solution of polymer to be hydrogenated is charged into the hydrogenation reactor, under a hydrogen atmosphere, followed by the dispersion of the catalyst. The whole mixture is then pressurized with hydrogen and brought to the desired temperature. When the hydrogenation has finished, the hydrogenated polymer is recovered according to the known techniques.

The catalytic compositions which can be obtained with the process of the present invention are active in the hydrogenation process also in very low quantities, indicatively up to 10 ppm of Titanium with respect to the polymer to be subjected to hydrogenation, with a ratio between Titanium moles and olefinic double bonds of up to 1:60000. This is certainly an advantage with respect to the catalysts of the prior art.

Although the catalytic composition which can be obtained with the process of the present invention can be applied to the hydrogenation of all hydrocarbon (co)polymers containing olefinic double bonds, the process is preferably applied to (co)polymers of conjugated dienes, obtained by polymerizing or copolymerizing conjugated dienes.

(Co)polymers of conjugated dienes comprise homopolymers of conjugated dienes, interpolymers of various conjugated dienes and copolymers obtained by copolymerizing at least one conjugated diene with at least one olefin copolymerizable with the above conjugated diene.

Typical examples of conjugated dienes are 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene and 3-butyl-1,3-octadiene. Particularly useful as intermediates for the production of elastomers having excellent physico-chemical properties are isoprene and 1,3-butadiene, more preferably 1,3-butadiene. Typical examples are therefore polybutadiene, polyisoprene and butadiene/isoprene copolymers.

Olefinic monomers which can be used in the copolymerization together with the above dienes are all unsaturated monomers copolymerizable with the above conjugated dienes, particularly vinyl substituted aromatic hydrocarbons. Among these styrene, o-methyl styrene, p-methyl styrene, vinyl naphthalene, are particularly preferred. In particular the most useful vinyl aromatic compound is styrene.

Typical examples of block copolymers which can be used in the hydrogenation process described above are those having general formula $(B-T-A-B)_nX$ and $(A-T-B)_nX$, wherein B are polydiene blocks, the same or different, A is a polyvinylaromatic block, T is a statistic copolymer segment made up of diene and vinylaromatic monomeric units, X is a coupling radical with a valence of n, n is an integer from 1 to 20, the content of T segment being from 0 to 40% by weight. When n is equal to 1, X is the residue of a terminating agent, for example $-Si-(CH_3)_3$ when monochlorotrimethylsilane is used; when n is equal to or higher than 2, X is the residue of a coupling agent, such as for example $=Si(CH_3)_2$ in the case of dimethyldichlorosilane, $\equiv Si(CH_3)$ in the case of methyltrichlorosilane and $=Si=$ in the case of silicon tetrachloride.

In the above block copolymers, the content of vinyl-substituted aromatic hydrocarbons is from 5 to 95%, preferably from 10 to 60%. In the above copolymers the content of 1,2 or 3,4 units of the polydiene phase can vary from 10 to 80%, preferably from 30 to 60%, depending on the quantity and type of vinylpromoting agent used in the synthesis of the starting unsaturated polymer.

As well as the block styrene-diene copolymers indicated above, with the process of the present invention, it is possible to hydrogenate random copolymers with a linear or branched structure having monomers statistically distributed in the polymeric chain and quantities of 1,2 or 3,4 units varying from 10 to 80% by weight.

The molecular weight of the (co)polymers which can be used in the hydrogenation process of the present invention is not particularly relevant. Generally, however, they have a number average molecular weight of from 1000 to about a million.

The (co)polymers which can be used in the present invention can be produced with any method described in the prior art, for example anionic polymerization and polymerization using organometallic complexes. The above (co)polymers are preferably prepared by anionic polymerization in the presence of at least one organic compound having at least one Lithium atom in the molecule. Examples of these organic compounds of Lithium are n-propyl Lithium, iso-propyl Lithium, n-butyl Lithium, sec-butyl Lithium, ter-butyl Lithium, n-pentyl Lithium, 1,4-dilithium-n-butane, 1,5-dilithium-pentane, 1,2-dilithium-diphenyl ethane.

When the polymerization is carried out with the anionic polymerization technique, using the composition of the present invention it is possible to hydrogenate with a surprisingly low quantity of titanium, non-living polymers which however have been previously coupled or deactivated.

The process of the present invention is advantageous as it allows the desired structure of the block copolymer (linear or branched or relative mixtures) to be obtained, which is obviously maintained during the hydrogenation. This possibility would however be excluded if the living polymer, as obtained at the end of the polymerization started by Lithium, were directly subjected to hydrogentation.

The process of the present invention allows the production of a superactive catalyst as it can be used, without penalization in terms of reaction rate, with quantities of up to about 10 ppm of Titanium measured on the dry polymer.

The following examples are provided for a better understanding of the present invention.

EXAMPLE 1—COPOLYMER I

Synthesis of an SBS copolymer by sequential method in the presence of tetrahydrofuran.

8400 g of cyclohexane, 174 g of styrene and 43 g of tetrahydrofuran are charged into a 25 l pressure-resistant reactor; when the system has been thermostat-regulated at 45° C., 16 ml of a 1.5 M solution of sec-butyl-lithium are added. After 30 min. 852 g of 1,3-butadiene are added and left to react for 15 minutes. A further 174 g of styrene are then added and left to react for 10 minutes. 12 ml of a 2 M solution of trimethyl-chloro-silane in cyclohexane are added to the polymeric solution thus obtained. The polymer thus obtained has a Mw of 50000, a polydispersity of 1.03 and a styrene content of 29% by weight. The content of 1,2 in the polybutadiene phase is 40%.

EXAMPLE 2—COPOLYMER II

Synthesis of an SBS copolymer by sequential method in the presence of 1,2-di-n-butoxy-ethane.

8400 g of cyclohexane, 174 g of styrene and 3.9 g of 1,2-di-n-butoxy-ethane are charged into a 25 l pressure-resistant reactor; when the system has been thermostat-regulated at 45° C., 16 ml of a 1.5 M solution of sec-butyl-lithium are added. After 30 min. 852 g of 1,3-butadiene are added and left to react for 15 minutes. A further 174 g of styrene are then added and left to react for 10 minutes. 12 ml of a 2 M solution of trimethyl-chloro-silane in cyclohexane are added to the polymeric solution thus obtained. The polymer thus obtained has the same characteristics as copolymer I.

EXAMPLE 3—COPOLYMER III

Synthesis of an SBS copolymer with a low coupling efficiency.

8400 g of cyclohexane, 156 g of styrene and 61 g of tetrahydrofuran are charged into a 25 l pressure-resistant reactor, when the system has been thermostat-regulated at 45° C., 22.8 ml of a 1.5 M solution of sec-butyl-lithium are added. After 30 min. 1044 g of 1,3-butadiene are added and left to react for 15 minutes. 6 ml of a 2 M solution of dimethyl-dichlorosilane in cyclohexane are added to the polymeric solution thus obtained and after 10 min. 5.1 ml of a 2 M solution of trimethyl-chloro-silane. The polymer thus obtained has a bimodal distribution of the molecular weights characterized by a fraction (70% by weight) of coupled copolymer having a Mw of 70000 and a fraction of non-coupled copolymer (the remaining 30%). Styrene content of 13% by weight and vinyl content of 39%.

EXAMPLE 4—COPOLYMER IV

Synthesis of an SBS copolymer with a high molecular weight via coupling.

8400 g of cyclohexane, 348 g of styrene and 43 g of tetrahydrofuran are charged into a 25 l pressure-resistant reactor; when the system has been thermostat-regulated at 45° C., 16 ml of a 1.5 M solution of sec-butyl-lithium are added. After 30 min. 852 g of 1,3-butadiene are added and left to react for 15 minutes. 12 ml of a 2 M solution of dimethyl-dichlorosilane in cyclohexane are added to the polymeric solution thus obtained. The polymer has a bimodal molecular weight distribution characterized in that it has 95% of triblocks (Mw of 100000) and the remaining 5% of non-coupled polymer. Styrene content of 29% by weight and vinyl content of 41%.

EXAMPLE 5—COPOLYMER V

Synthesis of an [SB]$_4$ copolymer.

8400 g of cyclohexane, 348 g of styrene and 86 g of tetrahydrofuran are charged into a 25 l pressure-resistant reactor; when the system has been thermostat-regulated at 45° C., 32 ml of a 1.5 M solution of sec-butyl-lithium are added. After 30 min. 852 g of 1,3-butadiene are added and left to react for 15 minutes. 6 ml of a 2 M solution of silicon tetrachloride in cyclohexane are added to the polymeric solution thus obtained. The polymer thus obtained has a bimodal molecular weight distribution characterized by a percentage of radial polymer (Mw of 100000) of 90% and non-coupled linear polymer of 10%.

EXAMPLE 6—COPOLYMER VI

Synthesis by the sequential method of an SIS.

8400 g of cyclohexane, 174 g of styrene and 0.96 g of tetrahydrofuran are charged into a 25 l pressure-resistant reactor: when the system has been thermostat-regulated at 45° C., 16 ml of a 1.5 M solution of sec-butyl-lithium are added. After 30 min. 852 g of isoprene are added and left to react for 15 minutes. A further 174 g of styrene are then added and left to react for 10 minutes. 12 ml of a 2 M solution of trimethyl-chloro-silane in cyclohexane are added to the polymeric solution thus obtained. The polymer thus obtained has a Mw of 51000, a polydispersity of 1.02 and a styrene content of 29% by weight.

EXAMPLE 7

7-A Preparation of the catalytic composition.

0.28 g of bis-cyclopentadienyltitanium dichloride, 100 ml of cyclohexane and 0.25 ml of a 0.45 M solution of 1,2-di-n-butoxy-ethane, are charged into a 500 ml reactor, under an argon atmosphere, so as to have a molar ratio between di-n-butoxy-ethane and titanium of 0.1/1. 4.5 ml of a 1 M solution of di-isobutyl magnesium in heptane are added to this suspension in order to have a molar ratio magnesium/titanium of 4. This mixture is left under stirring for 45 minutes at a temperature of between 20 and 30° C.

7-B Hydrogenation reaction—Tests 1–5

4800 g of polymeric solution are charged into a 16 liter reactor under a hydrogen atmosphere and under stirring and then thermostat-regulated at 70° C.

The catalytic composition prepared under point 7-A is then added to this solution so as to obtain a quantity of 90 ppm of titanium with respect to the dry polymer, with a ratio of olefinic double bond moles/titanium moles of 6850.

The hydrogen pressure in the reactor is then brought to 5 Kg/cm$^2$. The results obtained for polymers of the type I, III, IV, V, VI are shown in Tab. 1.

EXAMPLE 8

Effect of the type of ether in synthesis: Test 6

Using the same procedure as in tests 1–5, the hydrogenation reaction is carried out on the polymer type II. The polymer has a hydrogenation degree of the polybutadiene phase >98% after 90 minutes. The result is shown in Tab. 1.

TABLE 1

| Test | 1 | 2 | 3 | 4 | 5 | 6 |
|---|---|---|---|---|---|---|
| Polymer | I | III | IV | V | VI | II |
| Reaction time (min) necessary for obtaining a hydrogenation degree of the diene phase >98% | 60 | 60 | 60 | 60 | 180* | 90 |
| Hydrogenation degree styrene % | <1 | <1 | <1 | <1 | <1 | <1 |

*in the case of this polymer (copolymer S-I-S), the hydrogenation degree after 180' is 91%.

The data of table 1 show how the catalytic compositions prepared with the process of the present invention are very effective in the hydrogenation phase, regardless of the type of block copolymer. Only with polymer II is there a slight decrease in the hydrogenation rate, whereas with copolymer VI a complete hydrogenation is not reached during the experimentation.

EXAMPLE 9

Effect of the quantity of titanium: Tests 7–21

Using the same procedure as in example 7, the preparation of the catalytic composition is carried out using:

0.55 g of bis-cyclopentadienyl-titanium-dichloride, 0.14 ml of an 0.45 M solution of di-n-butoxy-ethane and 2.5 ml of a 1M solution of di-isobutyl-magnesium in heptane so as to have a molar ratio magnesium/titanium of 5 (Tests 7-10-13-16-19).

0.077 g of bis-cyclopentadienyl-titanium-dichloride, 0.07 ml of an 0.45 M solution of di-n-butoxy-ethane and 1.6 ml of a 1 M solution of di-isobutyl-magnesium in heptane so as to have a molar ratio magnesium/titanium of 6 (Tests 8-11-14-17-20).

0.031 g of bis-cyclopentadienyl-titanium-dichloride, 0.03 ml of an 0.45 M solution of di-n-butoxy-ethane and 0.7 ml of a 1 M solution of di-isobutyl-magnesium in heptane so as to have a molar ratio magnesium/titanium of 7 (Tests 9-12-15-18-21).

The hydrogenation is then carried out as described in example 7-B on polymers of the type I, II, III, IV, V, VI. The results, comprising the tests previously indicated in table 1, are shown in Tab. 2.

TABLE 2

| Polymer | I | | | | II | | | | III | | | | IV | | | |
|---|---|---|---|---|---|---|---|---|---|---|---|---|---|---|---|---|
| Test | 1 | 7 | 8 | 9 | 6 | 10 | 11 | 12 | 2 | 13 | 14 | 15 | 3 | 16 | 17 | 18 |
| Ti content (ppm on dry product) | 90 | 50 | 25 | 10 | 90 | 50 | 25 | 10 | 90 | 50 | 25 | 10 | 90 | 50 | 25 | 10 |
| Hydrogenation degree diene phase (%) after 60 minutes | >98 | 95 | 79 | 70 | 93 | 85 | 70 | 50 | >98 | 94 | 80 | 68 | >98 | 96 | 80 | 68 |
| Hydrogenation degree diene phase (%) after 90 minutes | — | >98 | 86 | 78 | >98 | 87 | 77 | 57 | — | >98 | 85 | 76 | — | >98 | 84 | 77 |

TABLE 2-continued

| | | | | | | | | | | | | | | | | |
|---|---|---|---|---|---|---|---|---|---|---|---|---|---|---|---|---|
| Hydrogenation degree diene phase (%) after 120 minutes | — | — | 92 | 85 | — | 93 | 83 | 65 | — | — | 93 | 85 | — | — | 92 | 82 |
| Hydrogenation degree diene phase (%) after 150 minutes | — | — | >98 | 94 | — | 96 | 86 | 69 | — | — | >98 | 95 | — | — | >98 | 93 |
| Hydrogenation degree diene phase (%) after 180 minutes | — | — | — | >98 | — | >98 | 91 | 76 | — | — | — | >98 | — | — | — | >98 |
| Hydrogenation degree styrene phase (%) at reaction end | <1 | <1 | <1 | <1 | <1 | <1 | <1 | <1 | <1 | <1 | <1 | <1 | | | | |

| | Polymer | V | | | | VI |
|---|---|---|---|---|---|---|
| Test | | 4 | 19 | 20 | 21 | 5 |
| Ti content (ppm on dry product) | | 90 | 50 | 25 | 10 | 90 |
| Hydrogenation degree diene phase (%) after 60 minutes | | >98 | 96 | 78 | 72 | 94 |
| Hydrogenation degree diene phase (%) after 90 minutes | | — | >98 | 84 | 78 | >98 |
| Hydrogenation degree diene phase (%) after 120 minutes | | — | — | 91 | 86 | — |
| Hydrogenation degree diene phase (%) after 150 minutes | | — | — | >98 | 92 | — |
| Hydrogenation degree diene phase (%) after 180 minutes | | — | — | — | >98 | |
| Hydrogenation degree styrene phase (%) at reaction end | | <1 | <1 | <1 | <1 | |

The data of table 2 show how, in the case of S-B-S copolymers, the catalytic composition of the present invention is effective in hydrogenation also at levels of 10 ppm of Titanium.

Again with respect to copolymers containing styrene and butadiene blocks, the hydrogenation is effective regardless of the copolymer type and preparation method. A small reduction in the hydrogenation rate occurs only with copolymer II, an SBS copolymer prepared in presence of 1,2-di-n-butoxy-ethane instead of THF.

EXAMPLE 10

Effect of ether in preformation: Tests 22–27.

Using the same procedure as in example 7-A, the preparation of the catalytic composition is carried out using as preformation solvent 100 ml of cyclohexane (Comparative Test 22), 100 ml of cyclohexane+0.25 ml of an 0.45 M solution in cyclohexane of 1,2-dibutoxy-ethane (Test 1), 100 ml of 1,2-dibutoxy-ethane (Comparative Test 23), 100 ml of cyclohexane+4 g of tetrahydrofuran (Test 24), 100 ml of tetrahydrofuran (Comparative Test 25), 100 ml of cyclohexane+1 g of toluene (Test 26) and 100 ml of toluene (Comparative test 27). The hydrogenation is carried out on a type I polymer, according to what is described in example 7-B. The results obtained are shown in Tab. 3.

TABLE 3

| Test | 22 comparative | | 23 comparative | | 25 comparative | | 27 comparative |
|---|---|---|---|---|---|---|---|
| Solvent | Cyclohexane | Cyclohex. + 1,2 dibutoxyethylene | 1,2 dibutoyx-ethane | Cyclohexane + THF | Tetrahydrofuran (THF) | Cyclohexane + Toluene | Toluene |
| Hydrogenation degree diene phase (%) after 60 minutes | 45 | >98 | 5 | 85 | 5 | 98 | 25 |
| Hydrogenation degree diene phase (%) after 90 minutes | 50 | — | 5 | 94 | 5 | — | 28 |
| Hydrogenation degree diene phase (%) after 120 minutes | 60 | — | 6 | <98 | 6 | — | 30 |
| Hydrogenation degree diene phase (%) after 150 minutes | 62 | — | 10 | — | 10 | — | 32 |
| Hydrogenation degree | <1 | <1 | <1 | <1 | <1 | <1 | <1 |

TABLE 3-continued

| Test | 22 comparative | 23 comparative | 25 comparative | 27 comparative |
|---|---|---|---|---|
| diene phase (%) after 180 minutes | | | | |
| Hydrogenation degree styrene phase (%) at reaction end | | | | |

These data show that the diluent used in the preparation phase of the catalytic composition decisively influences the hydrogenation reaction. In fact, the catalytic compositions prepared in the presence of cyclohexane alone (comparative test 22), toluene alone (comparative test 27), THF alone (comparative test 25) and 1,2-dibutoxy-ethane alone (comparative test 23) do not allow adequate reaction rates to be obtained.

On the contrary the catalytic compositions prepared in cyclohexane+ethers (tests 1 and 24) or in cyclohexane+toluene (test 26) prove to be extremely active.

EXAMPLE 11

Effect of the alkylating agent: Comparative test 28

Using the same procedure described in example 7, the preparation of the catalytic composition is carried out using 9 ml of an 0.5 M solution of n-butyl-lithium in cyclohexane.

The hydrogenation is carried out on a type I polymer. The results obtained are shown in Tab. 4.

TABLE 4

| Test Alkylating agent | 1 di-butylmagnesium | 28 comparative n-butyllithium |
|---|---|---|
| Hydrogenation degree butadiene phase (%) after 60 minutes | >98 | 13 |
| Hydrogenation degree butadiene phase (%) after 90 minutes | — | 15 |
| Hydrogenation degree butadiene phase (%) after 120 minutes | — | 22 |
| Hydrogenation degree butadiene phase (%) after 210 minutes | — | 25 |
| Hydrogenation degree styrene phase (%) at reaction end | <1% | <1% |

The data of this table show the fundamental importance of having an alkylating agent which is an organoderivative of Magnesium. In fact the catalytic composition prepared using an alkylating agent based on Lithium is decisively less effective in the hydrogenation phase.

EXAMPLE 12—Comparative test 29.

The preparation of the catalytic composition is carried out with the same procedure as example 7-A. The suspension thus obtained is decanted for 24 hours and the limpid surnatant liquid is subsequently removed with a syringe. The above liquid is then used in hydrogenation, as indicated in example 7-B. The polymer has a hydrogenation degree of the polybutadiene phase equal to 10% after 150 minutes.

We claim:

1. A catalytic composition prepared by the reaction of:
   (A) at least one bis(cyclopentadienyl)Titanium derivative having the general formula (I) $(C_5H_5)_2Ti(R)(R_1)$ wherein R and $R_1$, the same or different, are halogens, the above compound (I) being solid or dispersed in one or more nonsolvent diluents selected from the group consisting of aliphatic and cycloaliphatic saturated hydrocarbons and mixtures thereof,
   (B) at least one organo derivative having general formula (II) $M(R_2)(R_3)$, wherein M is selected from Zinc and Magnesium, and $R_2$ and $R_3$, the same or different, are selected from $C_1$–$C_{16}$ alkyls; and
   (C) at least one modifier selected from the group consisting of ethers and aromatic hydrocarbon compounds.

2. The catalytic composition according to claim 1, wherein $R=R_1=Cl$.

3. The catalytic composition according to claim 1, wherein M is Magnesium and $R_2$ and $R_3$, the same or different, are selected from $C_1$–$C_8$ alkyls.

4. The catalytic composition according to claim 1, wherein the compound (I) is dispersed in one or more non-solvent diluents.

5. The catalytic composition according to claim 4, wherein the non-solvent diluent essentially consists of cyclohexane.

6. The catalytic composition according to claim 1, wherein the molar ratio between $M(R_2)$ $(R_3)$ (II) and Titanium dicyclopentadienyl derivative (I) is from 1:1 to 10:1.

7. The catalytic composition according to claim 5, wherein the molar ratio between $M(R_2)$ $(R_3)$ (II) and Titanium dicyclopentadienyl derivative (I) is from 3:1 to 7:1.

8. The catalytic composition according to claim 1, wherein the molar ratio between modifier (C) and Ti is from 0.01:1 to 200:1.

9. The catalytic composition according to claim 7, wherein, when (C) is an aromatic hydrocarbon compound, the molar ratio between modifier (C) and Titanium is from 1:1 to 100:1.

10. The catalytic composition according to claim 7, wherein, when (C) is an ether, the molar ratio between modifier (C) and Titanium is from 0.01:1 to 100:1.

11. The catalytic composition according to claim 1, wherein the ether (C) is selected from $C_1$–$C_{20}$ ethers of ethylene glycol and diethyleneglycol, and tetrahydrofuran.

12. The catalytic composition according to claim 10, wherein the ether (C) is selected from $C_4$–$C_8$ ethers of ethylene glycol.

13. A process for the selective hydrogenation of olefinic double bonds present in polymers and copolymers of conjugated dienes, which comprises putting the polymer or copolymer of conjugated dienes in contact with hydrogen in an inert solvent in the presence of the catalytic composition according to claim 1, wherein at least 50% of the olefinic double bonds are selectively hydrogenated.

14. The process according to claim 13, wherein temperatures of between 20 and 110° C. and pressures of between 1 and 50 bars are used, the solvents of the (co)polymers essentially consisting of aliphatic or cycloaliphatic, saturated hydrocarbons, and relative mixtures.

15. The process according to claim 13, wherein olefinic double bonds present in copolymers between dienes and vinylbenzenes are subjected to selective hydrogenation.

16. The process according to claim 13, wherein block copolymers are subjected to hydrogenation, having general formula $(B-T-A-B)_nX$ and $(A-T-B)_nX$, wherein B are polydiene blocks, the same or different, A is a polyvinylaromatic block, T is a statistic copolymer segment made up of diene and vinylaromatic monomeric units, X is a coupling radical with a valence of n, n is an integer from 1 to 20, the content of T segment being from 0 to 40% by weight.

17. The process according to claim 16, wherein block B is a polydiene block selected from polybutadiene and polyisoprene and block A is a polystyrene block.

18. The process according to claim 13, wherein the catalytic composition has a Titanium content of at least 5 parts per million with respect to the dry polymer.

19. The process according to claim 18, wherein the Titanium content is at least 10 parts per million with respect to the dry polymer.

20. The process according to claim 13, wherein at least 90% of the olefinic double bonds are selectively hydrogenated.

* * * * *